(12) United States Patent
Brown

(10) Patent No.: US 7,305,655 B2
(45) Date of Patent: Dec. 4, 2007

(54) VERTICAL REQUIREMENTS DEVELOPMENT SYSTEM AND METHOD

(75) Inventor: Robert Scott Brown, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 825 days.

(21) Appl. No.: 10/679,010

(22) Filed: Oct. 3, 2003

(65) Prior Publication Data

US 2004/0073888 A1 Apr. 15, 2004

Related U.S. Application Data

(60) Provisional application No. 60/464,939, filed on Apr. 23, 2003, provisional application No. 60/417,462, filed on Oct. 9, 2002.

(51) Int. Cl.
*G06F 9/45* (2006.01)

(52) U.S. Cl. .................................................. 717/104
(58) Field of Classification Search ................. 717/104
See application file for complete search history.

(56) References Cited

U.S. PATENT DOCUMENTS

| | | |
|---|---|---|
| 6,061,514 A | 5/2000 | Kuno |
| 6,292,707 B1 | 9/2001 | Hair et al. ..................... 700/97 |
| 2002/0078046 A1 | 6/2002 | Uluakar et al. |
| 2002/0147517 A1 | 10/2002 | Messler ....................... 700/97 |
| 2003/0055659 A1 | 3/2003 | Alling .......................... 705/1 |

FOREIGN PATENT DOCUMENTS

| | | |
|---|---|---|
| EP | 1 227 418 A1 | 7/2002 |
| WO | 02/50634 A2 | 6/2002 |

*Primary Examiner*—John Chavis
(74) *Attorney, Agent, or Firm*—Renner, Otto, Boisselle & Sklar, LLP

(57) ABSTRACT

A vertical requirements development method is provided for developing requirements for a system to be developed. The system to be developed includes top-level requirements and is representable by a program specification tree made up of multiple layers of individual system elements, with each lower layer of the multiple layers comprising individual system elements having lower level requirements associated therewith compared to an upper layer. The method includes the steps of identifying, based on the top-level requirements, a plurality of system level requirements analyses which, upon satisfaction, comply with the top-level requirements; and for each system level requirements analysis, allocating specification requirements to each of the individual system elements that contribute to the satisfaction of that system level requirements analysis, regardless of the level of the individual system elements that contribute in the program specification tree.

15 Claims, 11 Drawing Sheets

| | |
|---|---|
| TL1 | 1 Scope |
| TL28 | This document analyzes, budgets, and allocates the time line requirements for the Weapon System. |
| TL2 | 2 Applicable Documents |
| TL29 | MIS-PRF-99999, System Performance Specification |
| TL96 | 999999, Weapon System Launch Sequence |
| TL4 | 3 Requirements Analysis |
| TL78 | 3.1 Trigger Pull to First Missile Motion |
| TL79 | The system shall initiate first missile motion within 150 ms of operator trigger pull. [WS69] |
| TL91 | 3.1.1 Analysis |
| TL105 | Per discussions with the aircraft design agent, the aircraft will require as much as 10 ms from trigger pull until a launch signal is provided to the launcher. |
| TL107 | Since the Launcher is GFE the time required by the launcher is fixed. Per the launcher spec and measurements taken on actual launchers, the launcher will require as much as 2 ms to receive the launch signal from the aircraft and provide a battery initiate pulse to the missile. |
| TL108 | Per discussions with the battery manufacturer, the battery will require as much as 100 ms to come up to power after receipt of a battery initiate pulse. |
| TL109 | Again, since the launcher is GFE the time required to sense battery power and initiate a launch command is fixed. Per the launcher spec and measurements taken on actual launchers, the launcher will require as much as 5 ms. |
| TL110 | Per discussions with the rocket motor manufacturer, the rocket motor will require as much as 5 ms to initiate missile motion after receipt of a launch command. |
| TL111 | TABLE I. LAUNCH TIMELINE SUMMARY |

| | |
|---|---|
| Aircraft | 10ms |
| Launcher (battery pulse) | 2ms |
| Battery | 100ms |
| Launcher (motor pulse) | 5ms |
| Rocket Motor | 5ms |
| Margin | 28ms |
| Total | 150ms |

| | |
|---|---|
| TL92 | 3.1.2 Output Requirements |
| TL136 | 3.1.2.1 Launch Signal |
| TL140 | The aircraft shall provide a launch signal to the launcher within 10 ms of trigger pull. |
| TL143 | 3.1.2.2 Power Up |
| TL144 | The battery shall come up to power within 100 ms after receipt of a battery initiate pulse. |
| TL145 | 3.1.2.3 Missile Motion |
| TL146 | The rocket motor shall initiate missile motion within 5 ms after receipt of a launch command. |
| TL147 | 3.2 Ready to Fire Time |

| | | System Level Requirement Anaylsis | System Element Spec. |
|---|---|---|---|
| WS11 | Cat: Characteristics | | |
| WS12 | Cat: Performance | | |
| WS67 | Cat: Trigger Pull to First Missile Motion | | |
| WS69 | The system shall initiate first missile motion within 150 ms of operator trigger pull | Timeline | |
| WS70 | Cat: Ready to Fire Time | | |
| ... | ... | | |
| ... | ... | | |
| ... | ... | | |
| WSnn | Top Level Requirement nnn | | |
| | | | |
| | | | |
| TL4 | Cat: Requirements Analysis | | |
| TL78 | Cat: Trigger Pull to First Missile Motion | | |
| TL79 | The system shall initiate first missile motion within 150 ms of operator trigger pull [WS69] | Timeline | |
| TL91 | Cat: Analysis | | |
| TL105 | Per discussions with the aircraft design agent, the aircraft will require as much as 10 ms from trigger pull until a launch signal is provided to the launcher. | | |
| TL107 | Since the Launcher is CFE the time required by the lancher is fixed. Per the launcher spec and measurements taken on actual launchers, the launcher will require as much as 2 ms to receive the launch signal from the aircraft and provide a battery initiate pulse to the missile | | |
| TL108 | Per discussion with the battery manufacturer, the battery will require as much as 100 ms to come up to power after receipt of a battery initiate pulse | | |
| TL109 | Again, since the launcher is GFE the time required to sense battery power and initiate a launch command is fixed. Per the launcher spec and measurements taken on actual launchers, the launcher will require as much as 5 ms. | | |
| TL110 | Per discussions with the rocket motor manufacturer, the rocket motor will require as much as 5 ms to initiate missile motion after receipt of a launch command. | | |

FIG. 8A 28 ( cont. )

| | | | |
|---|---|---|---|
| TL111 | Table 1: Launch Timeline Summary<br><br>Aircraft 10 ms<br>Launcher (battery pulse) 2 ms<br>Battery 100 ms<br>Launcher (motor pulse) 5 ms<br>Rocket Motor 5 ms<br>Margin 28 ms<br>Total 150 ms | | |
| ... | ... | | |
| ... | ... | | |
| | | | |
| TL92 | Cat: Output Requirements | | |
| TL136 | Cat: Launch Signal | | | — SID
| TL140 | The aircraft shall provide a launch signal to the launcher within 10 ms of trigger pull. | | Launch Platform | — SID
| TL143 | Cat: Power Up | | | — SID
| TL144 | The battery shall come up to power within 100 ms after receipt of a battery initiate pulse. | | Missile, Battery | — SID
| TL145 | Cat: Missile Motion | | | — SID
| TL146 | The rocket motor shall initiate missile motion within 5 ms after receipt of a launch command. | | Missile, Rocket Motor | — SID
| TL147 | Cat: Ready to Fire Time | | |
| ... | ... | | |
| ... | ... | | |

FIG. 8B

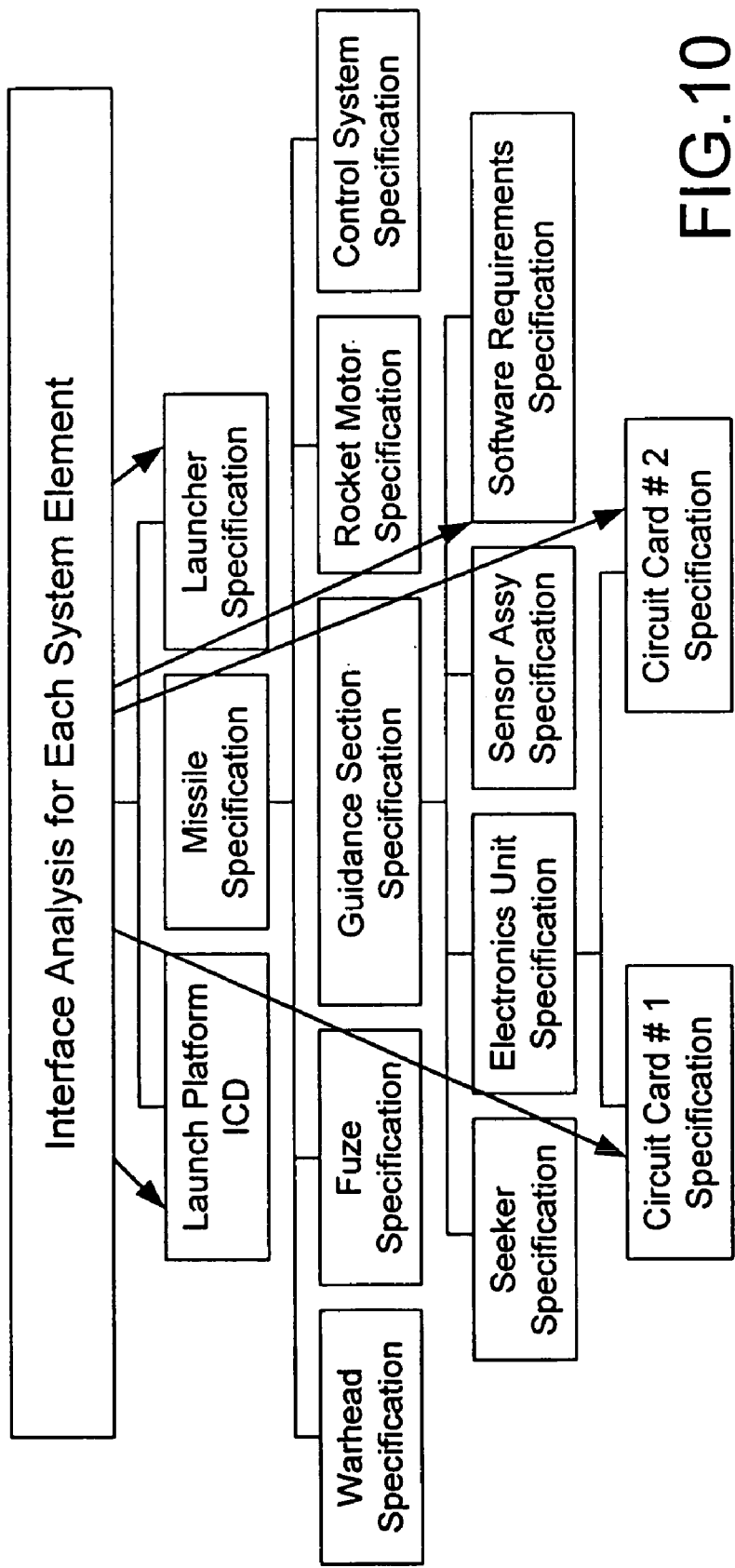

VERTICAL REQUIREMENTS DEVELOPMENT SYSTEM AND METHOD

CROSS-REFERENCE TO RELATED APPLICATIONS

This application claims priority under 35 USC §119(e) to U.S. Provisional Application Nos. 60/417,462, filed Oct. 9, 2002, and 60/464,939, filed Apr. 23, 2003. The entire disclosure of each of these applications is hereby incorporated herein by reference.

TECHNICAL FIELD

The present invention relates generally to system design and development, and more particularly to a system and method for developing system requirements.

BACKGROUND OF THE INVENTION

System design and development is known in the art. A customer will typically contract with a designer/manufacturer to design and develop a system. The customer typically provides top-level system requirements within the contract. However, these requirements describe the performance of the entire system, and systems are designed and developed as individual elements (e.g., circuit cards, software packages, etc.). Hence, requirements development is the process of defining the requirements of each of the individual system elements such that they all work together to form an optimum system level solution.

Good requirements development is critical to the success of any development program. Complex systems require many different system elements to be developed at the same time and still be functional as large systems once integrated together. Hence, providing the detailed design requirements to each lower level element designer is crucial to the lower level designers' ability to create a good design the first time.

Traditionally, development programs have used a layered approach to generating lower level requirements for a system. As is illustrated in FIG. 1, such traditional approach starts with the top-level system requirements (typically provided by the customer contract) and a specification tree of the system to be developed. The top-level requirements are analyzed and flowed down to the next level in the specification tree, resulting in the development of the second level specifications. Next, the second level specifications are analyzed and flowed down to the next level in the specification tree, resulting in the development of the third level specifications. This process is then repeated until all the requirements have been flowed to the lowest level in the specification tree. The designers then use these specifications to develop the individual system elements.

As an example, FIG. 1 illustrates a typical specification tree, in this case relating to the development of weapons system. The top-level requirements typically come from the customer contract. Next, specifications are developed for each major sub-program (e.g., launch platform specification, missile specification, and launcher specification). Next, the major system element specifications for each sub-program are developed based on flowing down from the previous level specifications. In FIG. 1, only the major system elements for the missile specifications are shown (e.g., warhead specification, fuze specification, guidance section specification, etc.), although it will be appreciated that each sub-program will have its' own major system element specifications. In the fourth level, the major system element specifications from the third level are flowed down to define the specifications for the next level of system elements. In the case of the guidance section specification, the next level of system elements includes seeker specification, electronic unit specification, sensor assembly specification.

The above process is repeated until the last level of the program specification tree is populated. In the case of the electronics unit specification of the guidance section specification, the last level may include circuit card No. 1 specification and circuit card No. 2 specification, for example. Again, while each system element has not been fully expanded at each level in FIG. 1 for sake of clarity, it will be appreciated that each system element will likely have additional system elements dependent therefrom in lower levels.

Unfortunately, however, poor requirements development frequently negatively impacts the success of a complex development program. Bad or late requirements can cause the designer of a lower level system element to design to the wrong requirements at that level, thus creating a design that, when integrated with the other system elements, does not allow the system to meet the top level requirements. This can cause the particular system element, and possibly other system elements, to have to be redesigned, often resulting in massive cost and development schedule impacts.

With the above-described traditional layered approach, the emphasis is on each horizontal level of the program specification tree. This leads to one drawback wherein the approach is slow to get the requirements to the lowest levels of the specification tree. The layered approach requires the lowest level requirements to pass through many levels before the lowest level system element requirements can be developed.

Another drawback is that complex requirements are usually analyzed multiple times during flow-down from one level to the next. For example, a first set of analyses is done to determine the allocation of requirements at the second level of the specification tree, then again to determine the allocation between the elements at the next level, and so on. Each time the analysis is repeated in increasing level of detail, in order to refine the requirements as they flow down through the system. However, repeating the analysis many times can be inefficient. Also, there is a considerable likelihood of discontinuities between the analyses. In some cases the analyses are done completely up front, but then can be misunderstood later, forgotten, or even lost later in the requirements flow-down process.

Yet another drawback is that margins tend to be managed independently at each level of the flow-down. This can cause a lack of an integrated margin management approach across all levels of the specification tree. This lack of an integrated approach can cause more stringent requirements than necessary. Still another drawback is that if the requirements that were flowed down are found to be unachievable by the lower level system element designers, this is not discovered until late in the requirements development process. Thus, this often results in specification changes to the design element found to be unachievable. However, since this usually also results in a redistribution of requirements across other system elements, the specifications and designs of other system elements are also often impacted.

In view of the aforementioned shortcomings associated with traditional level-by-level requirements development, there is a strong need in the art for an approach which avoids delays in getting the proper requirements to the lowest level of the specification tree. Moreover, there is a strong need for an approach which avoids inefficiencies associated with multiple analyses of the same requirements. In addition, there is a strong need for an approach which avoids excessive margins that can result in unachievable requirements at the lower levels and/or overly stringent requirements.

SUMMARY OF THE INVENTION

The present invention relates to an automated system and method for developing system requirements which addresses the aforementioned shortcomings associated with the traditional layered approach. The present invention utilizes what is referred to herein as a "vertical approach" to requirements development. According to such vertical approach, the focus is on flowing all requirements directly to the lowest level in the specification tree. This is done by first flowing all the top level requirements to a series of system level requirements analyses, which then flow the requirements directly to each specification in the specification tree regardless of that particular specification's level within the specification tree.

Each top-level requirement is analyzed at the beginning of the approach. At that point, each requirement is also budgeted and allocated to each system element that contributes to the meeting of that requirement, regardless of the level of those elements in the specification tree. At the same time, the requirements margin for each requirement is determined and managed in the same analysis. Also, because the analyses are an indispensable part of the flow down process, an analysis database is changed in order to change any of the lower level specifications. By performing these analyses on every requirement, it shifts the focus away from the generation of specifications and instead focuses on the analysis of the requirements. Hence, the vertical approach creates analyses that determine each requirements allocation through the entire specification tree.

The present invention may be implemented using machine-readable code (e.g., computer software) executed on a computer or other automated processing device.

According to one aspect of the invention, a vertical requirements development method is provided for developing requirements for a system to be developed. The system to be developed includes top-level requirements and is representable by a program specification tree made up of multiple layers of individual system elements, with each lower layer of the multiple layers comprising individual system elements having lower level requirements associated therewith compared to an upper layer. The method includes the steps of identifying, based on the top-level requirements, a plurality of system level requirements analyses which, upon satisfaction, comply with the top-level requirements; and for each system level requirements analysis, allocating specification requirements to each of the individual system elements that contribute to the satisfaction of that system level requirements analysis, regardless of the level of the individual system elements that contribute in the program specification tree.

According to another aspect of the invention, a vertical requirements development system is provided for developing requirements for a system to be developed. The system includes a plurality of terminals; a requirements management database comprising a digital data storage medium and a server executing machine readable code for managing data stored in the digital data storage medium; and a network interconnecting the plurality of terminals and the requirements management database. Based on the top-level requirements, a plurality of system level requirements analyses are identified which, upon satisfaction, comply with the top-level requirements. For each system level requirements analysis, specification requirements are allocated to each of the individual system elements that contribute to the satisfaction of that system level requirements analysis, regardless of the level of the individual system elements that contribute in the program specification tree. The specification requirements allocated to each of the individual system elements are stored in the requirements management database.

According to yet another aspect of the invention, a data structure is provided useful in association with a vertical requirements development method for developing requirements for a system to be developed. The database structure includes data storage area for storing the specification requirements allocated to each of the individual system elements digitally in a requirements management database.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 7 is an exemplary user interface illustrating an exemplary requirements analysis entry in accordance with the present invention;

FIGS. 8A and 8B represent the content of the requirements management database in accordance with an exemplary embodiment of the present invention;

FIG. 10 is a diagram illustrating a derived requirements development aspect of the vertical requirements development system in accordance with the present invention.

DETAILED DESCRIPTION OF THE INVENTION

The present invention will now be described with reference to the drawings, wherein like reference labels are used to refer to like elements throughout.

Figure 1:
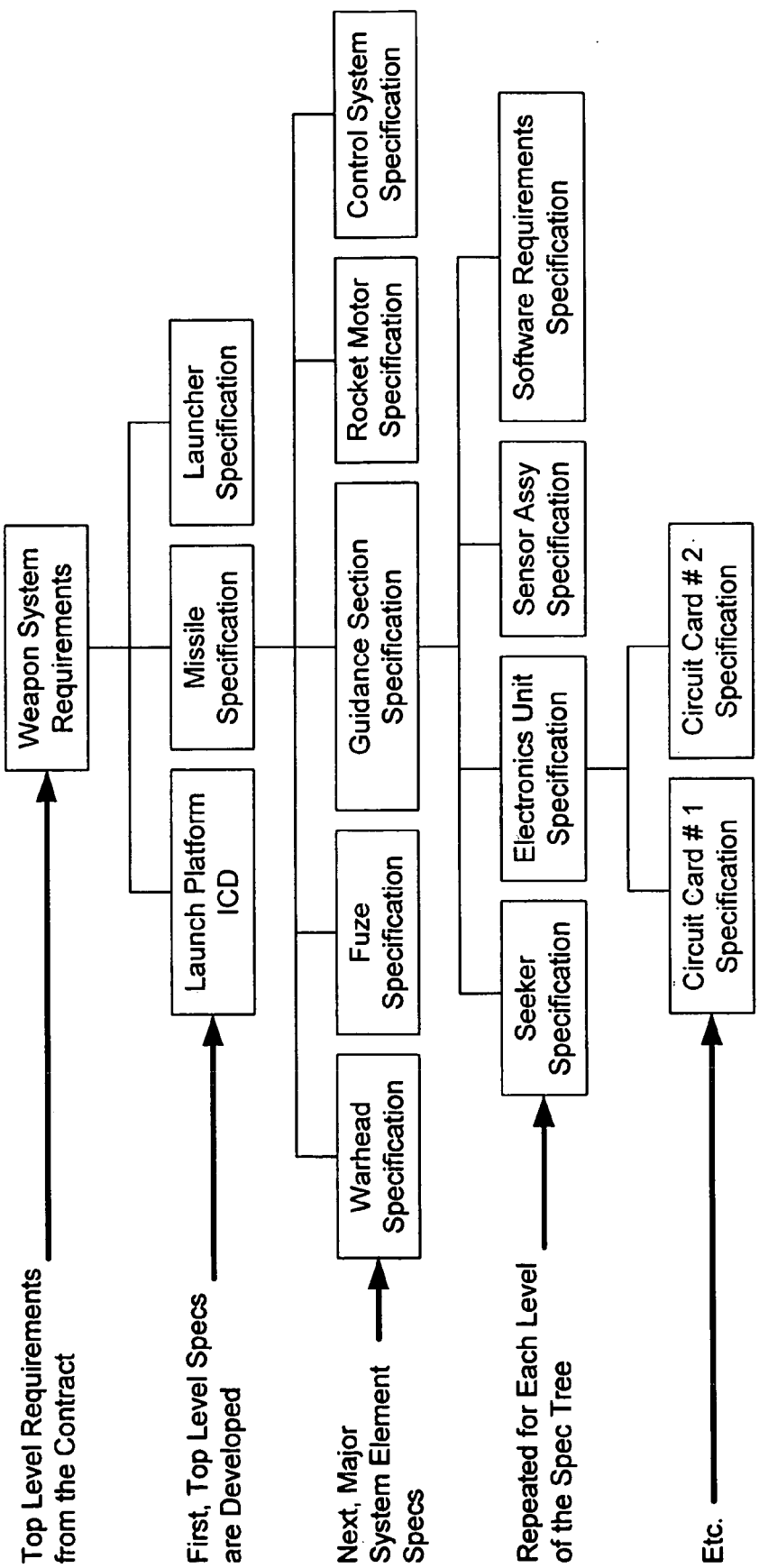
FIG. 1 is a conventional program specification tree representing system requirements development in accordance with a traditional layered approach.
Figure 2:
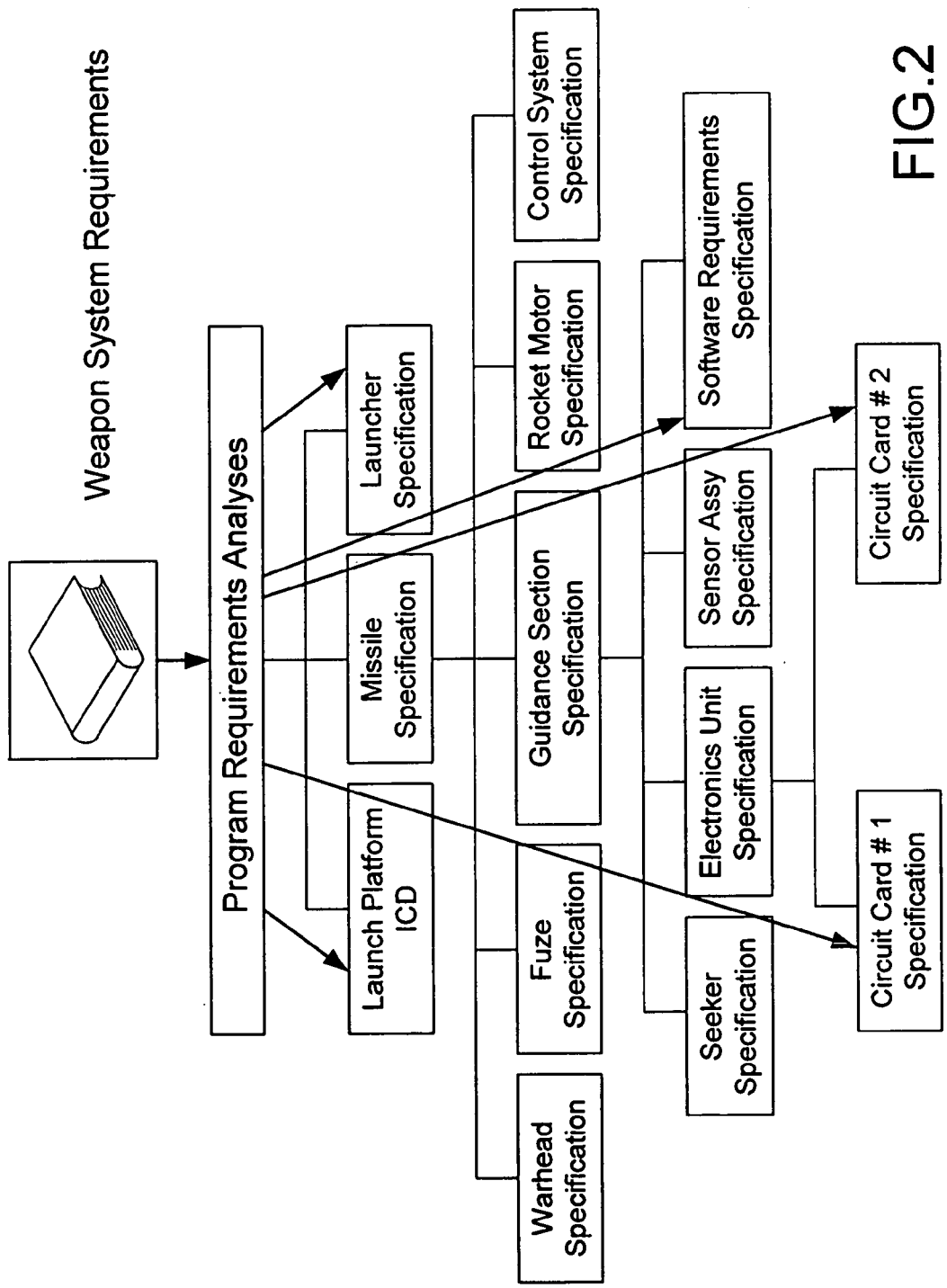
FIG. 2 is an exemplary program specification tree representing system requirements development in accordance with a vertical requirements development approach of the present invention.

Referring now to FIG. 2, shown is an exemplary program specification tree representing system requirements development in accordance with a vertical requirements development approach of the present invention. As in FIG. 1, the program specification tree in this example pertains to the development of a weapons system. However, the requirements for the system elements within the specification tree are not developed horizontally level-by-level as in the conventional approach described above with respect to FIG. 1. Rather, according to the present invention the requirements are flowed directly to the lowest level in the specification tree. This is done by first flowing all the top level requirements to a series of system level requirements analyses, referred to in FIG. 2 as "Program Requirements Analyses". These system level requirements analyses serve to flow the requirements directly to each specification in the specification tree regardless of that particular specification's level within the specification tree. Thus, as represented by the arrows in FIG. 2, the present invention does not require development on a level-by-level analysis.

Figure 3:
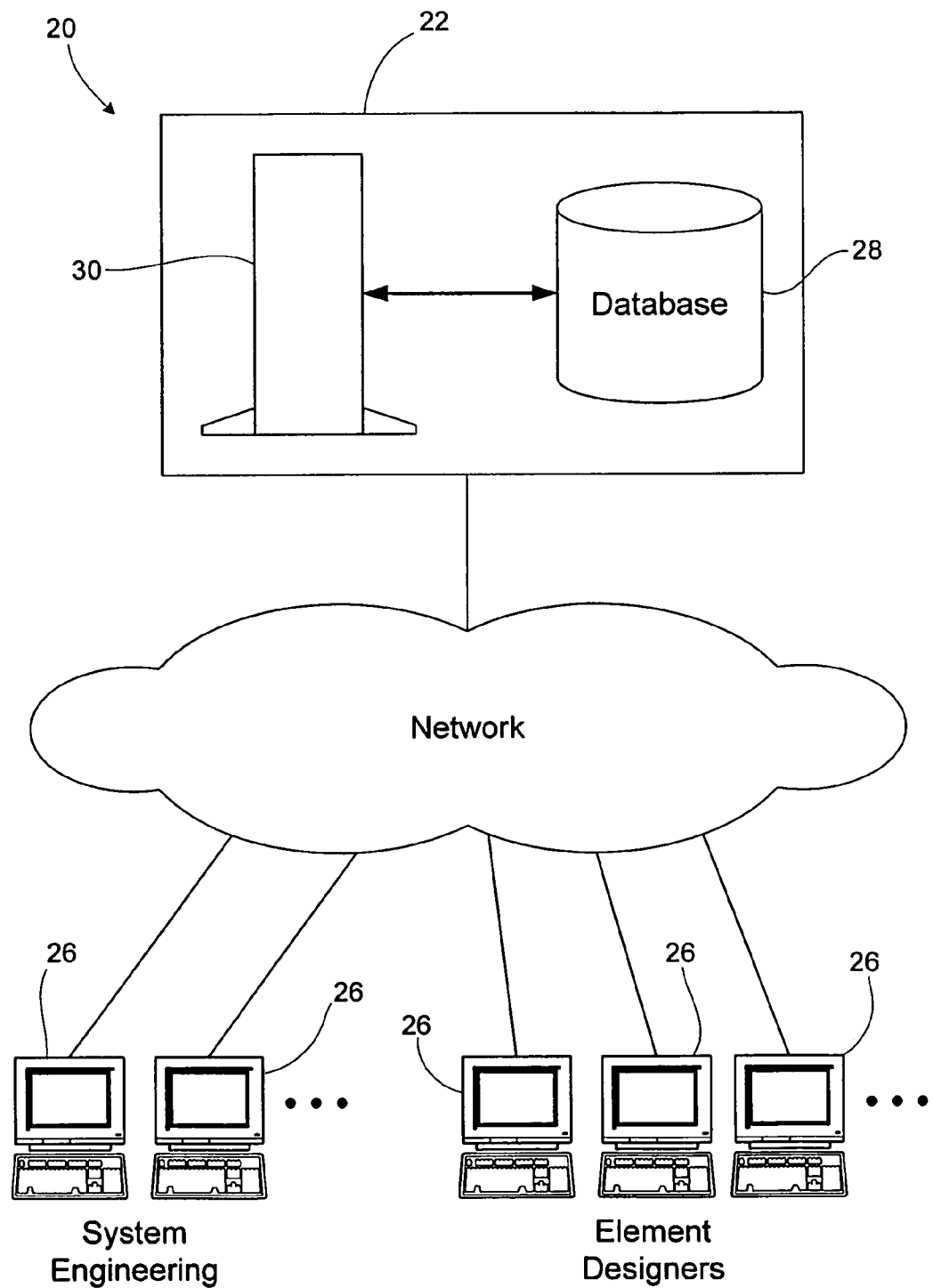
FIG. 3 is a diagram illustrating a vertical requirements development system in accordance with the present invention.

FIG. 3 illustrates a vertical requirements development system 20 in accordance with the exemplary embodiment of the present invention. The system 20 includes a requirements management database 22 linked via a network 24 to a plurality of user input/output terminals 26. One or more of the terminals 26 may be associated with users representing system engineering which perform upper level operations in relation to the program specification tree of FIG. 2. Moreover, one or more of the terminals 26 may be associated with lower level operations in relation to the program specification tree. Such lower level operations may include circuit board design, etc., representing the development of the lower level system elements.

The requirements management database 22 includes a data storage medium 28 for storing requirements data as will be described in more detail below. The data storage medium may be any electronic data storage device such as a magnetic or optical disk hard drive, flash memory, digital tape, etc., as will be appreciated by those having ordinary skill in the art. In addition, the requirements management database 22 includes a requirements management server 30 for controlling operations of the development system 20. More specifically, the server 30 comprises a computer such as a personal computer or mainframe which writes data to and accesses data from the database 28 in accordance with the invention. Even more specifically, the various functions of the present invention as described herein are compiled in computer or machine-readable code which is stored and executed on the server 30 using conventional programming and database techniques. A person having ordinary skill in the art of computer programming, based on the description provided herein, would be able to provide machine-readable code for carrying out all of the functions described herein without undue effort or experimentation. Accordingly, details of the particular programming have been omitted herein for sake of brevity. The server 30 executes such code in order to carry out the functions described herein in relation to the development of the requirements based on information and data input within the system via the terminals 26 as further described herein.

Figure 4:
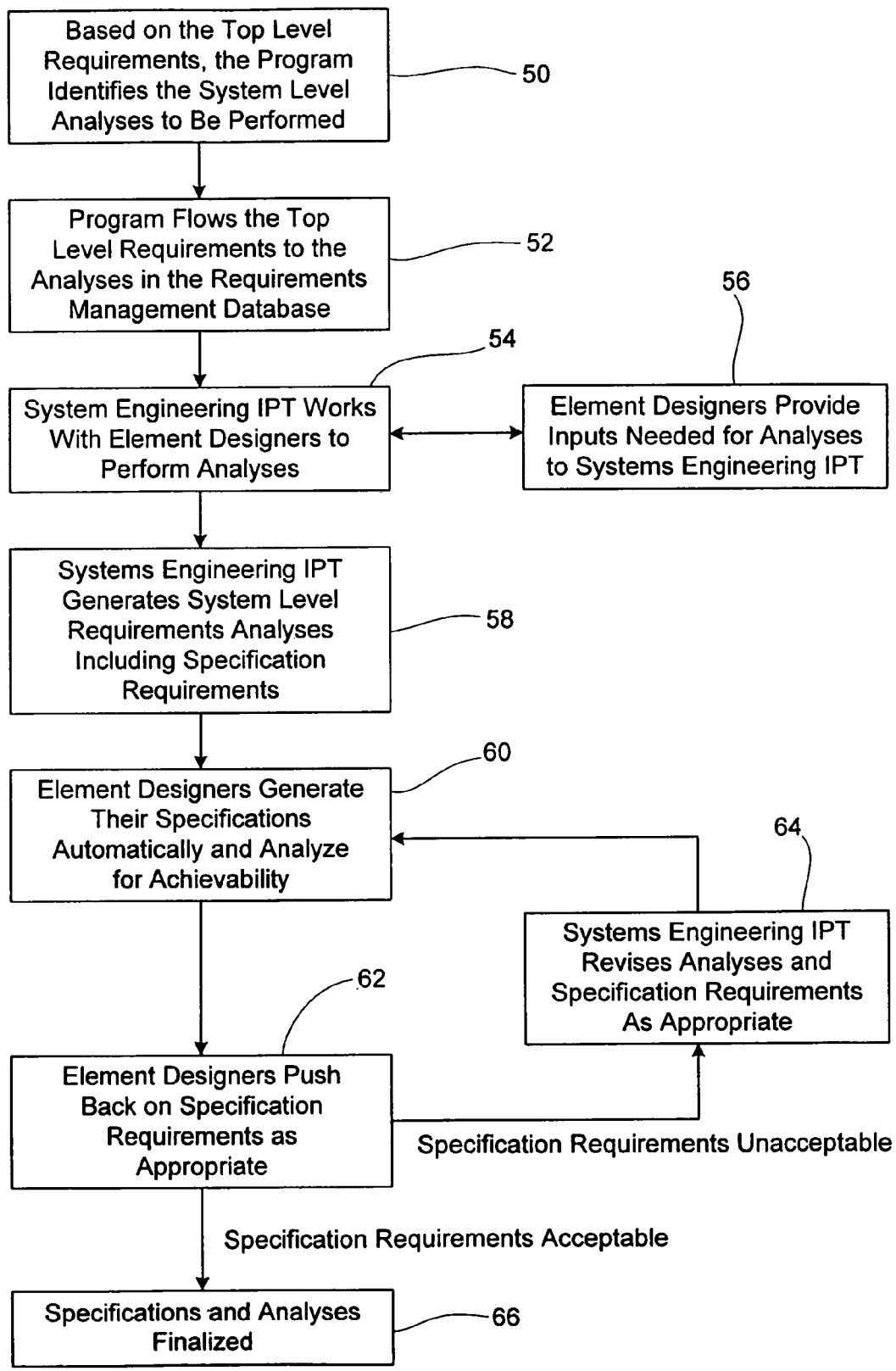
FIG. 4 is a flowchart representing operation of the vertical requirements development system in accordance with the present invention.

FIG. 4 is a flowchart representing an overview of the operation of the system 20. Beginning in step 50, the top level requirements for the system to be developed (e.g., the weapons system requirements in FIG. 2) are provided. As noted above, such top level requirements are typically provided by the customer such as in the customer contract. Based on the top level requirements, the system 20 identifies the system level requirements analyses to be performed. Such system level requirement analyses to be performed may be entered via one or more of the terminals 26 by a user(s) familiar with the particular type of system development.

Figure 5:
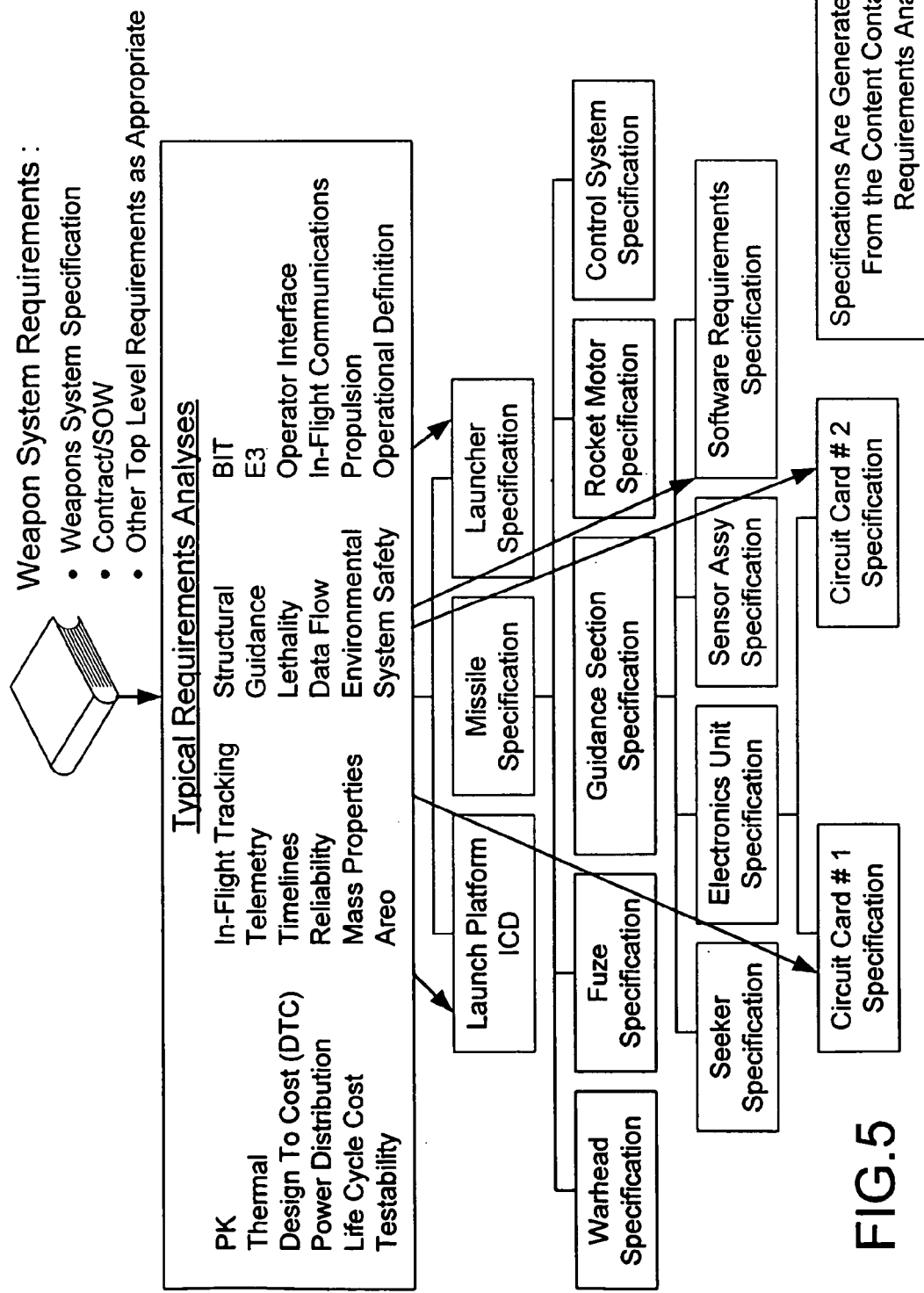
FIG. 5 is a more detailed view of the program specification tree of FIG. 2 in accordance with the present invention.

For example, FIG. 5 illustrates within the box entitled "Typical Requirements Analyses" the particular system level requirements analyses which are to be performed when developing a weapons system. Such requirements analyses may include, but are not limited to, Probability of Kill (Pk), Thermal, Design to Cost (DTC), Power Distribution, . . . , Timelines, Reliability, etc. In step 50, these system level requirements analyses are input to the system 20 via one or more of the terminals 26, for example, and are stored by the server 30 in the database 28. The user may be prompted by the server 30 to input the system level requirements analyses using an appropriately designed graphical user interface (GUI) presented at the terminal 26 as will be appreciated.

Alternatively, the server 30 may have prestored in the database 28 full or partial system level requirement analyses which relate to the particular type of system to be developed. For example, once the system level requirement analyses for developing a weapon system have been input, users subsequently developing another weapon system may access the system level requirement analyses already stored in the database 28 without the need to reenter such information. The server 30 may store previously entered system level requirement analyses for different types of systems on the database 28 and allow a user to access such information via a pull-down menu or the like from one of the terminals 26 as will be appreciated.

Figure 6:
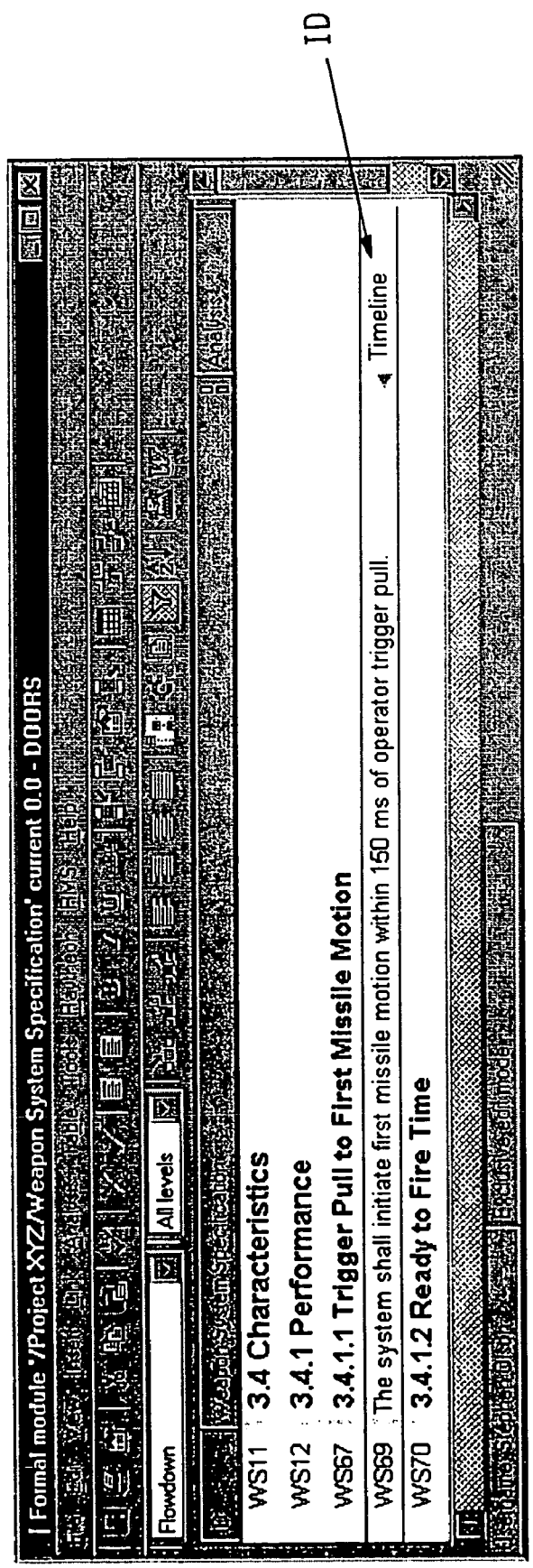
FIG. 6 is an exemplary user interface illustrating a system requirements entry in accordance with the present invention.

FIG. 6 illustrates an exemplary screen shown on a terminal 26 representing a user's ability to input the various system level requirement analyses. Such information may be input using a conventional database management software package such as the commercially available DOORS from Telelogic North America, Inc., or SLATE from EDS (Electronic Data Systems). FIG. 6 illustrates the entry of an exemplary top level requirement that the weapons system initiate a first missile motion within 150 ms of operator trigger pull, such requirement coming from the customer for example. The user at the terminal 26 may enter into the database 28 various headings or categories as line entries which facilitate evaluation and display of the requirements. Thus, for example, the user may enter the category "Characteristics" followed by the subcategories "Performance" and "Trigger Pull to First Missile Motion", as shown in the first three line entries in FIG. 6.

The top level requirement that the weapons system initiate a first missile motion within 150 ms of operator trigger pull, as known by those having ordinary skill in the art, would be associated with the "Timelines" system level requirements analysis (see, e.g., FIG. 5). Thus, the user at the terminal 26 enters the top level requirement "The system shall initiate first missile motion within 150 ms of operator trigger pull." under the appropriate heading "Trigger Pull to First Missile Motion" as shown in FIG. 6. In addition, the entry includes a field in which the user enters the identifier (ID) "Timeline" which is stored in the database 28 together with the top level requirement. The database 28 in combination with the database management software operating on the server 30 uses the identifier "Timeline" to link the top level requirement to the system level requirements analysis to which it applies.

A similar process is carried out for each of the top level requirements provided by the customer. The system 20 enables the user to enter each top level requirement into the database 28 together with a corresponding identifier which links the top level requirement to a corresponding system level requirements analysis. While FIG. 6 represents only the portion of the database 28 associated with the entry of the top level requirement that the system shall initiate first missile motion within 150 ms of operator trigger pull, it will be appreciated that the manner of entry of the remaining top level requirements will be the same.

In many cases, the applicable top-level requirements will extend beyond the top-level requirements provided by the customer. For example, design to cost or reliability requirements might appear in the contract statement of work rather than in the top-level requirements provided by the customer. The point is that all the requirements that should be flowed down to the designers to consider in their designs should be treated the same. All such requirements should be analyzed in the same manner described herein.

Following step 50, the process continues to step 52 in which the top level requirements (e.g., those provided by the customer and entered into the database 28 as described above) are flowed down to the system level requirements analyses identified in step 50.

FIG. 7 illustrates an example of a screen shown on the terminal 26 representing a user's ability to enter the Timeline system level requirements analysis. It will be appreciated that the process for the other system level requirements analyses will be the same, except with different data. As is shown in FIG. 7, the user may again enter various category or heading information such as "Scope", "Applicable Documents", "Requirements Analysis", etc. Alternatively, the system 20 may be configured to generate the appropriate headings automatically based on those previously entered by the user in relation to FIG. 6.

In step 52, the database management software running on the server 30 is programmed to automatically copy and paste under the heading "Requirements Analysis", any and all entries entered in step 50 (e.g., FIG. 6) for the corresponding system level requirements analysis. Thus, for example, under the heading "Requirements Analysis" for the Timeline system level requirements analysis as shown in FIG. 7, the system 20 copies any and all top level requirements entries associated with "Timeline" in step 50 into corresponding database entries within the Timeline system level requirements analysis section. This may be done simply by the server 30 searching for, filtering on, or viewing all entries having the ID "Timeline" entered therewith as described above in relation to FIG. 6.

In the exemplary embodiment, the entry "The system shall initiate first missile motion within 150 ms of operator trigger pull." is automatically copied into the Requirements Analysis section for the Timeline as shown in FIG. 7. In addition, the system 20 may also include a database entry identifier (e.g., "WS69") indicating from which original database entry the entry was copied. Thus, when a user at a terminal 26 accesses the contents of the database 28 within the Timeline Requirements Analysis, the system 20 will have automatically provided for the user a complete list of entries corresponding to the top level requirements associated with the analysis.

Next, in steps 54 and 56, system engineering users and element designers interact (via terminals 26, personal meetings, telephone, etc.) to develop the appropriate criteria for each systems level requirements analysis. The systems engineers and designers both may draw from experience, previously developed analyses, etc. Depending on the particular system being developed, e.g., weapon, automobile, etc., the particular criteria can be different as will be appreciated. The element designers may provide input to the systems engineers which is significant at the lower levels of the product specification tree, independent of other system elements at various other levels. Interaction between the system engineers and the element designers in steps 54 and 56 at this point in the requirements development allows the development of a set of requirements which, if satisfied, satisfies a given systems level requirement analysis.

More particularly, interaction in steps 54 and 56 will yield system level requirement analyses which each will typically include design requirements, margin requirements, etc., that will be effected by system elements on different levels of the program specification tree. Based on such knowledge, a user (typically a systems engineer) at a terminal 26 will be aware of the particular issues in a given analysis. In step 58, the user enters into the database 28 the relevant issues, concerns, requirements, etc. for each system level requirements analysis. Again, it is important to note that the analysis for a given system level requirement may encompass several levels of system elements in the specification tree.

The system level requirements analyses performed in the development of a system will vary from system to system, depending upon the top-level requirements.

The user in step 58 may then proceed to enter particulars associated with a given system level requirements analysis. Under the "Analysis" heading, the user enters various criteria explaining constraints, issues, parameters, etc., which define satisfaction of the system level requirements. Regarding trigger pull to first missile motion, a user at terminal 26 may enter the following into the database 28 as shown:

---

Per discussions with the aircraft design agent, the aircraft will require as much as 10 ms from trigger pull until a launch signal is provided to the launcher.
Since the Launcher is CFE the time required by the lancher is fixed. Per the launcher spec and measurements taken on actual launchers, the launcher will require as much as 2 ms to receive the launch signal from the aircraft and provide a battery initiate pulse to the missile
Per discussion with the battery manufacturer, the battery will require as much as 100 ms to come up to power after receipt of a battery initiate pulse
Again, since the launcher is GFE the time required to sense battery power and initiate a launch command is fixed. Per the launcher spec and measurements taken on actual launchers, the launcher will require as much as 5 ms.
Per discussions with the rocket motor manufacturer, the rocket motor will require as much as 5 ms to initiate missile motion after receipt of a launch command.

---

TABLE 1

Launch Timeline Summary

| | |
|---|---|
| Aircraft | 10 ms |
| Launcher (battery pulse) | 2 ms |
| Battery | 100 ms |
| Launcher (motor pulse) | 5 ms |
| Rocket Motor | 5 ms |
| Margin | 28 ms |
| Total | 150 ms |

Such entries address design criteria for several system elements, such as the launch platform (e.g., aircraft), launcher, battery, rocket motor, etc. These criteria flow down different levels of the program specification tree, and are not restricted to one level as will be appreciated.

Also in step 58, the user enters into the analysis the specification requirements necessary for the satisfaction of the analysis based on the information compiled in steps 54 and 56. For example, the database 28 includes an "Output Requirements" section in each of the system level requirements analyses as exemplified in FIG. 7. Under an appropriate category or heading, a user enters the specifications into the database 28. From the exemplary Timeline system level requirements analysis which is summarized in the "Launch Timeline Summary" of Table 1, such specifications include that fact that the aircraft (launch platform) must provide a launch signal to the launcher within 10 ms of trigger pull; the battery must come up to power within 100 ms after receipt of a battery initiate pulse; and the rocket motor shall initiate missile motion within 5 ms after receipt of a launch command.

Accordingly, the user enters into the database 28 the specification requirement "The aircraft shall provide a launch signal to the launcher within 10 ms of trigger pull" under the heading "Launch Signal" as shown in FIG. 7. Moreover, the entry includes a field in which the user enters a specification identifier (SID) which identifies the particular system element or elements within the specification tree to which the entered specification applies. Thus, for example, the specification entry that the aircraft provide a launch signal to the launcher within 10 ms of trigger pull includes a user entered SID identifying the "Launch Platform" system element. Similarly, the user via the terminal 26 enters the specification "The battery shall come up to power within 100 ms after receipt of a battery initiate pulse" together with the SIDs "Missile" and "Battery" as the specification relates to the Missile and Battery system elements. Likewise, the user enters the specification "The rocket motor shall initiate missile motion within 5 ms after receipt of a launch command" together with the SIDs "Missile" and "Rocket Motor" as the specification relates to the Missile and Rocket Motor system elements.

Step 58 is repeated for every specification requirement generated through each of the system level requirements analyses so as to populate the database 28. FIGS. 8A and 8B illustrate an exemplary structure of the information thus stored within the database 28. The database 28 may be generalized as storing data representing the top level requirements with links to the applicable system level requirement analyses. In addition, the database 28 stores data representing the respective system level analyses together with links to the applicable system elements. Using the aforementioned links, the requirements management database 22 can automatically generate and/or view specifications for individual system elements as well as portions of the system or the entire system.

More particularly, step 60 in FIG. 4 represents a step in which the present invention allows element designers to generate their relevant specifications automatically. Moreover, step 60 provides the element designers with the ability to analyze the specifications for achievability. Specifically, the database 28 includes the SIDs for the respective specification requirements as noted above. The SIDs identify the particular system element(s) which relate to the specification. Thus, a user at a terminal 26 (in this case typically a designer) may query the database 28 via the server 30 for all specifications relating to a particular system element(s). The server 30, in turn, collects all the entries in the database which include a SID corresponding to the queried element(s). This information may then be provided to the user via the terminal 26 as the specification particular to the queried system element(s). In the case where the queried element constitutes a root on the program specification tree, the database management system 22 can be configured to locate all SIDs corresponding to the root system element as well as any system elements branching therefrom, as will be appreciated.

Figure 9:
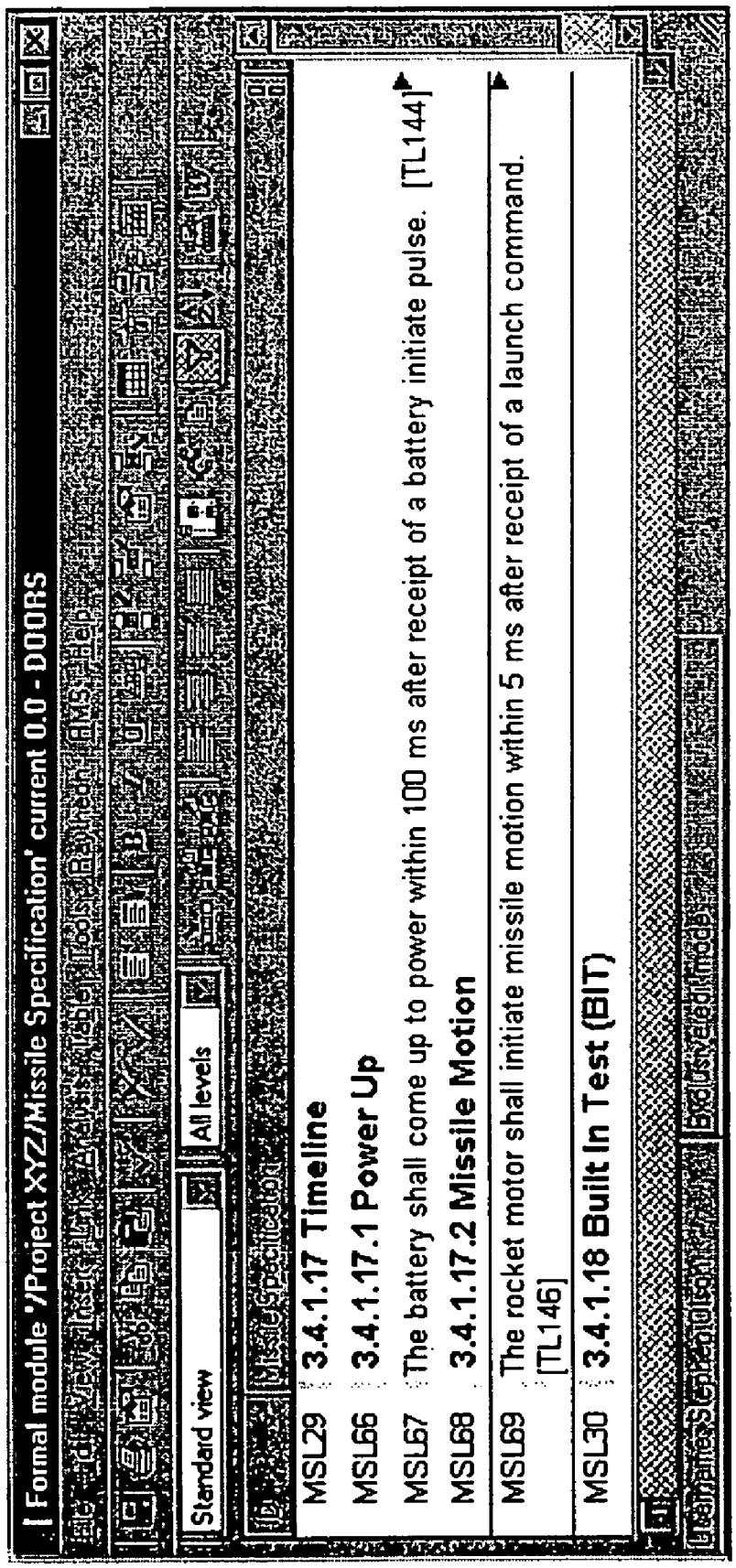
FIG. 9 is an exemplary user interface illustrating an exemplary element specification automatically generated in accordance with the present invention.

Thus, in step 60 the database management system 22 is able to collect all the requirements for the specific lower level system element that are likely scattered throughout the various system level analyses and assemble them into one report for the element designers. As a result, the system 22 is able to generate automatically the system element specifications from the various analyses. FIG. 9 illustrates an exemplary specification generated automatically. In the case where a user at a terminal 26 enters the system element "Missile Specification" to obtain specifications corresponding to the missile, the database management system 22 searches for all SIDs equal to "Missile" corresponding to the system element "Missile Specification". Thus, the automatically generated specification as shown in FIG. 9 will include the specification requirements "The battery shall come up to power within 100 ms after receipt of a battery initiate pulse" and "The rocket motor shall initiate missile motion within 5 ms after receipt of a launch command".

It is noted that the specification "The aircraft shall provide a launch signal to the launcher within 10 ms of trigger pull" does not appear in the output of FIG. 9. This is because the specification corresponds to the system element "Launch Platform" and not the queried "Missile Specification". In this manner, the requirements management database 22 only outputs the specification requirements pertaining to the system elements queried.

As noted in FIG. 9, the requirements management database 22 may be configured to automatically copy category or heading information into the generated specification and to generate appropriate sequencing and paragraph numbering to improve readability. In addition, the requirements management database 22 is configured to provide a link (e.g., "TL144") adjacent a respective specification requirement to identify the source of such requirement within the database. Such information is useful in the even further detail is desired as to the analysis which resulted in the specification.

Referring again to FIG. 4, the present invention also provides the feature that allows optimization through the collaboration of designers and system engineers. In step 62, element designers whom have obtained specification requirements generated in the manner above may review, understand and analyze their entire requirements set for achievability. If the element designers consider any specification requirements unachievable, they may "push back" on the specification requirements as appropriate. This may be done manually (e.g., personal conversations, emails, telephone calls, memorandums, etc.) or in the form of comments entered into the database 28 via the terminals 26 in relation with the respective specification requirements. In this way, the element designers can spawn a series of system wide negotiations and trade-offs. The tradeoffs and negotiations spawned will occur between the designers and the specification engineers who generated the requirements, as represented in step 64.

In the cases when designers and specification engineers cannot correct an issue, the other designers who are contributing to meeting the top level requirement may need to be pulled into the tradeoffs to resolve the issue. If this is still not successful, the engineers generating other requirements may also need to be pulled into the tradeoffs in order to optimize the system between not only the design elements but also between requirements.

Upon resolution, all facilitated by the requirements management database system 22, the specifications and analyses set up in the database may be revised and finalized as represented in step 66.

The above discussion relates primarily to specification requirements distributed to system elements to assure compliance with system level requirements. It will be appreciated, however, that other types of requirements may be introduced, such as requirements generated to provide a complete set of requirements to all system elements. Such requirements may be referred to as "derived" requirements. Such requirements may be those which are not defined to assure compliance with system level requirements, but which are otherwise needed by other elements. In addition, or in the alternative, for example, the derived requirements may be those needed to define common element interfaces. FIG. 10 illustrates such an interface analysis for the system elements. To the extent specification requirements are generated based on such derived requirements, the requirements are entered into the database 28 in step 58 (FIG. 4) in the same manner described above in relation to the allocated requirements.

Accordingly, the system 20 in accordance with the present invention may be summarized as a combination of (i) system level analyses; (ii) automatic specification generation; and (iii) system level optimization through collaboration. Within the system level analyses, system engineering generates requirements analyses on all requirements and allocates the requirements to the lowest levels in the system to be designed. In the automatic specification generation, the element designers may automatically generate their lower level specifications in the program specification tree. In the system level optimization, the element designers may analyze these specifications for achievability. Then, designers and system engineers can participate on the requirements tradeoffs and negotiations to obtain a system level optimization of the system element requirements. These tradeoffs and negotiations should continue until all of the systems engineers and all the designers agree that all of the requirements are acceptably defined.

The invention provides the advantage of shifting the focus from development of specifications to analysis of requirements. The requirements are fully analyzed at the beginning of a program before design effort starts. Design margins are managed in one place and better control of analyses content is provided. Analyses are captured in one place for all to see. The analysis database can be changed/updated to be kept current and change specifications. The system can generate specifications with first cut analysis during the proposal phase. Moreover, the system promotes system level optimization and develops requirements that the designers need the most first. Requirements are flowed down to the lower levels more quickly than in traditional approaches. The system maximizes the likelihood of getting the design correct the first time. In addition, configuration control of the requirements can increase through the life of the program.

It will be appreciated that the present invention has been described herein in the context of the development of a weapon system. However, the present invention has application to the development of any type of system and the invention is not intended to be limited in the broadest sense to any specific type of system.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A vertical requirements development method for developing requirements for a system to be developed, the system to be developed having top-level requirements and being representable by a program specification tree made up of multiple layers of individual system elements, with each lower layer of the multiple layers comprising individual system elements having lower level requirements associated therewith compared to an upper layer, the method comprising the steps of:

based on the top-level requirements, identifying a plurality of system level requirements analyses which, upon satisfaction, comply with the top-level requirements; and for each system level requirements analysis, allocating specification requirements to each of the individual system elements that contribute to the satisfaction of that system level requirements analysis, regardless of the level of the individual system elements that contribute in the program specification tree.

2. The method of claim 1, further comprising the step of storing the specification requirements allocated to each of the individual system elements digitally in a requirements management database.

3. The method of claim 2, further comprising the step of storing in the requirements management database information linking the specification requirements allocated to each of the individual system elements to the respective system elements.

4. The method of claim 3, further comprising the steps of submitting a query to the requirements management database requesting specification requirements linked to a specified individual system element, and the requirements management database providing an output in response to the query.

5. The method of claim 2, wherein the requirements management database comprises a digital data storage medium and a server executing software for managing data stored in the digital data storage medium.

6. The method of claim 1, further comprising the step of subsequently modifying the system level requirements analyses in conjunction with the allocated specification requirements in order to optimize development.

7. A vertical requirements development system for developing requirements for a system to be developed, the system to be developed having top-level requirements and being representable by a program specification tree made up of multiple layers of individual system elements, with each lower layer of the multiple layers comprising individual system elements having lower level requirements associated therewith compared to an upper layer, the system comprising:

a plurality of terminals;

a requirements management database comprising a digital data storage medium and a server executing machine readable code for managing data stored in the digital data storage medium; and a network interconnecting the plurality of terminals and the requirement management database, wherein based on the top-level requirements, a plurality of system level requirements analyses are identified which, upon satisfaction, comply with the top-level requirements;

for each system level requirements analysis, specification requirements are allocated to each of the individual system elements that contribute to the satisfaction of that system level requirements analysis, regardless of the level of the individual system elements that contribute in the program specification tree; and the specification requirements allocated to each of the individual system elements are stored in the requirements management database.

8. The system of claim 7, wherein the terminals are configured to permit users to enter the specification requirements allocated to each of the individual system elements into the requirements management database for storage.

9. The system of claim 7, wherein the requirements management database also has stored therein information linking the specification requirements allocated to each of the individual system elements to the respective system elements.

10. The system of claim 9, wherein the terminals are configured to permit users to enter the linking information into the requirements management database for storage.

11. The system of claim 9, wherein the requirements management database is configured to receive a query requesting specification requirements linked to a specified individual system element, and the requirements management database is programmed to provide automatically an output in response to the query.

12. The system of claim 11, wherein the terminals are configured to permit users to enter the query.

13. The system of claim 12, wherein the requirements management database is configured to provide the output to at least one of the terminals.

14. A computer storage medium comprising database structure useful in association with a vertical requirements development method for developing requirements for a system to be developed, the system to be developed having top-level requirements and being representable by a program specification tree made up of multiple layers of individual system elements, with each lower layer of the multiple layers comprising individual system elements having lower level requirements associated therewith compared to an upper layer, the method comprising the steps of based on the top-level requirements, identifying a plurality of system level requirements analyses which, upon satisfaction, comply with the top-level requirements; and for each system level requirements analysis, allocating specification requirements to each of the individual system elements that contribute to the satisfaction of that system level requirements analysis, regardless of the level of the individual system elements that contribute in the program specification tree, wherein the database structure comprises:

data storage area for storing the specification requirements allocated to each of the individual system elements digitally in a requirements management database.

15. The database structure of claim 14, further comprising additional data storage area for storing information linking the specification requirements allocated to each of the individual system elements to the respective system elements.

* * * * *